US012365080B2

(12) United States Patent
Chikaraishi et al.

(10) Patent No.: US 12,365,080 B2
(45) Date of Patent: Jul. 22, 2025

(54) ELECTRIC WORK MACHINE

(71) Applicant: MAKITA CORPORATION, Anjo (JP)

(72) Inventors: Makoto Chikaraishi, Anjo (JP); Akihiro Hozumi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 180 days.

(21) Appl. No.: 18/219,442

(22) Filed: Jul. 7, 2023

(65) Prior Publication Data

US 2024/0058937 A1 Feb. 22, 2024

(30) Foreign Application Priority Data

Aug. 18, 2022 (JP) ................................ 2022-130714

(51) Int. Cl.

*B25F 5/00* (2006.01)
*B25F 5/02* (2006.01)
*F21V 11/16* (2006.01)
*B25B 21/02* (2006.01)
*B25B 23/18* (2006.01)
*F21Y 115/10* (2016.01)

(52) U.S. Cl.

CPC ................ *B25F 5/02* (2013.01); *F21V 11/16* (2013.01); *B25B 21/02* (2013.01); *B25B 23/18* (2013.01); *F21Y 2115/10* (2016.08)

(58) Field of Classification Search

CPC .... B25F 5/02; B25F 5/00; B25F 5/021; B25F 5/008; B25B 21/02; B25B 23/18; B25B 21/00

USPC .......................................................... 173/93

See application file for complete search history.

(56) References Cited

U.S. PATENT DOCUMENTS 7,726,863 B2 * 6/2010 Brandstaetter ....... A61B 1/0676 362/399
2011/0058356 A1 * 3/2011 Friedman ............... B25F 5/021 362/119
2013/0021783 A1 * 1/2013 Vanko .................... B25B 21/00 362/119
2016/0354889 A1 12/2016 Ely et al.
2023/0147598 A1 * 5/2023 Tamura .................. B25B 23/18 81/54

FOREIGN PATENT DOCUMENTS

JP 2011012282 A5 * 1/2011 ............. C08J 11/06

* cited by examiner

*Primary Examiner* — Jacob A Smith
(74) *Attorney, Agent, or Firm* — Oliff PLC

(57) ABSTRACT

An electric work machine avoids lowering the visibility of a workpiece by an operator. An electric work machine includes a motor, an output unit operable with a rotational force from the motor, a light emitter at least partially surrounding the output unit, an optical member including an outer cylinder located radially outward from the light emitter, and a light transmitter located frontward from the light emitter to allow light emitted from the light emitter to pass through, and a light shield located radially outward from the outer cylinder.

19 Claims, 11 Drawing Sheets

ELECTRIC WORK MACHINE

CROSS-REFERENCE TO RELATED APPLICATIONS

This application claims the benefit of priority to Japanese Patent Application No. 2022-130714, filed on Aug. 18, 2022, the entire contents of which are hereby incorporated by reference.

BACKGROUND

1. Technical Field

The present disclosure relates to an electric work machine.

2. Description of the Background

In the technical field of electric work machines, known lighting systems for power tools are described in U.S. Patent Application Publication No. 2016/0354889 (hereafter, Patent Literature 1).

BRIEF SUMMARY

In Patent Literature 1, the lighting systems for power tools include one or more chip-on-board (COB) light-emitting diodes (LEDs). The COB LEDs emit light with high luminance. When light emitted from the COB LEDs at least partially reaches the eyes of an operator, such light may cause glare to the operator and thus lower the visibility of a workpiece.

One or more aspects of the present disclosure are directed to avoiding lowering the visibility of a workpiece by an operator.

A first aspect of the present disclosure provides an electric work machine, including:

- a motor;
- an output unit operable with a rotational force from the motor;
- a light emitter at least partially surrounding the output unit;
- an optical member including
  - an outer cylinder located radially outward from the light emitter, and
  - a light transmitter located frontward from the light emitter, the light transmitter being configured to allow light emitted from the light emitter to pass through; and
- a light shield located radially outward from the outer cylinder.

The electric work machine according to the above aspect of the present disclosure can avoid lowering the visibility of a workpiece by an operator.

DETAILED DESCRIPTION

One or more embodiments will now be described with reference to the drawings. In the embodiments, the positional relationships between the components will be described using the directional terms such as right and left (or lateral), front and rear (or frontward and rearward), and up and down (or vertical). The terms indicate relative positions or directions with respect to the center of an electric work machine.

Electric Work Machine

Figure 1:
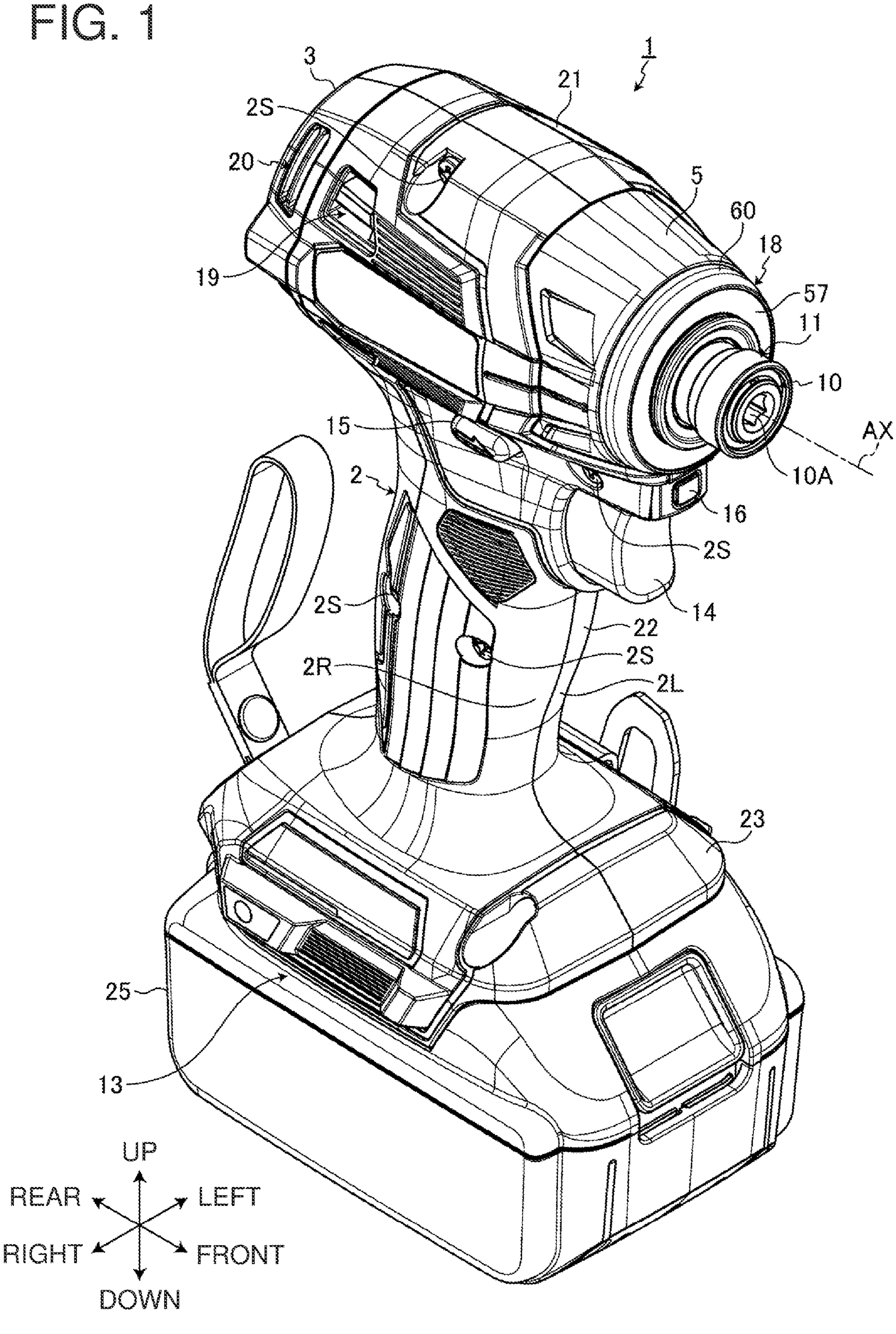
FIG. 1 is a perspective view of an electric work machine according to an embodiment as viewed from the front.
Figure 2:
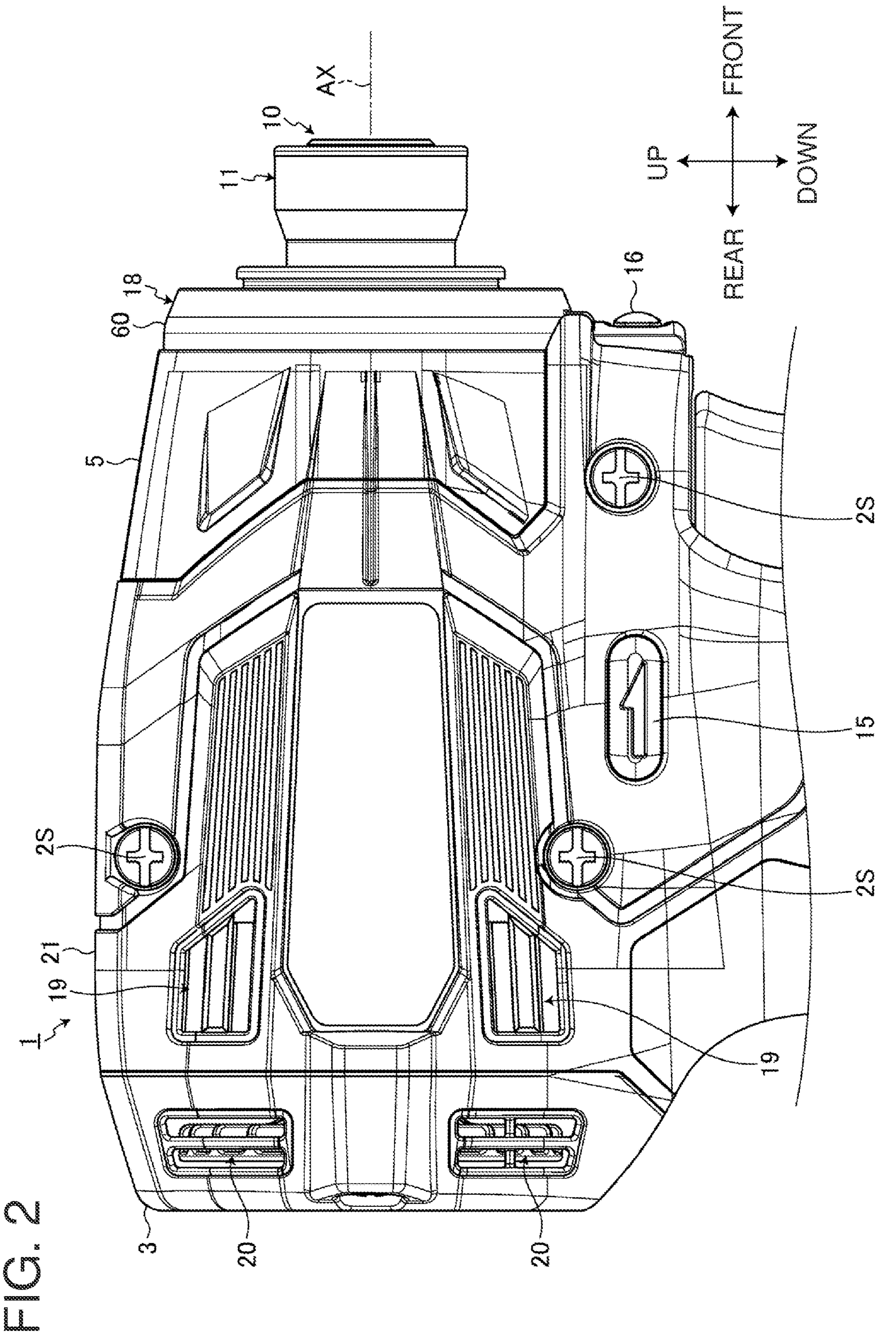
FIG. 2 is a side view of an upper portion of the electric work machine according to the embodiment.
Figure 3:
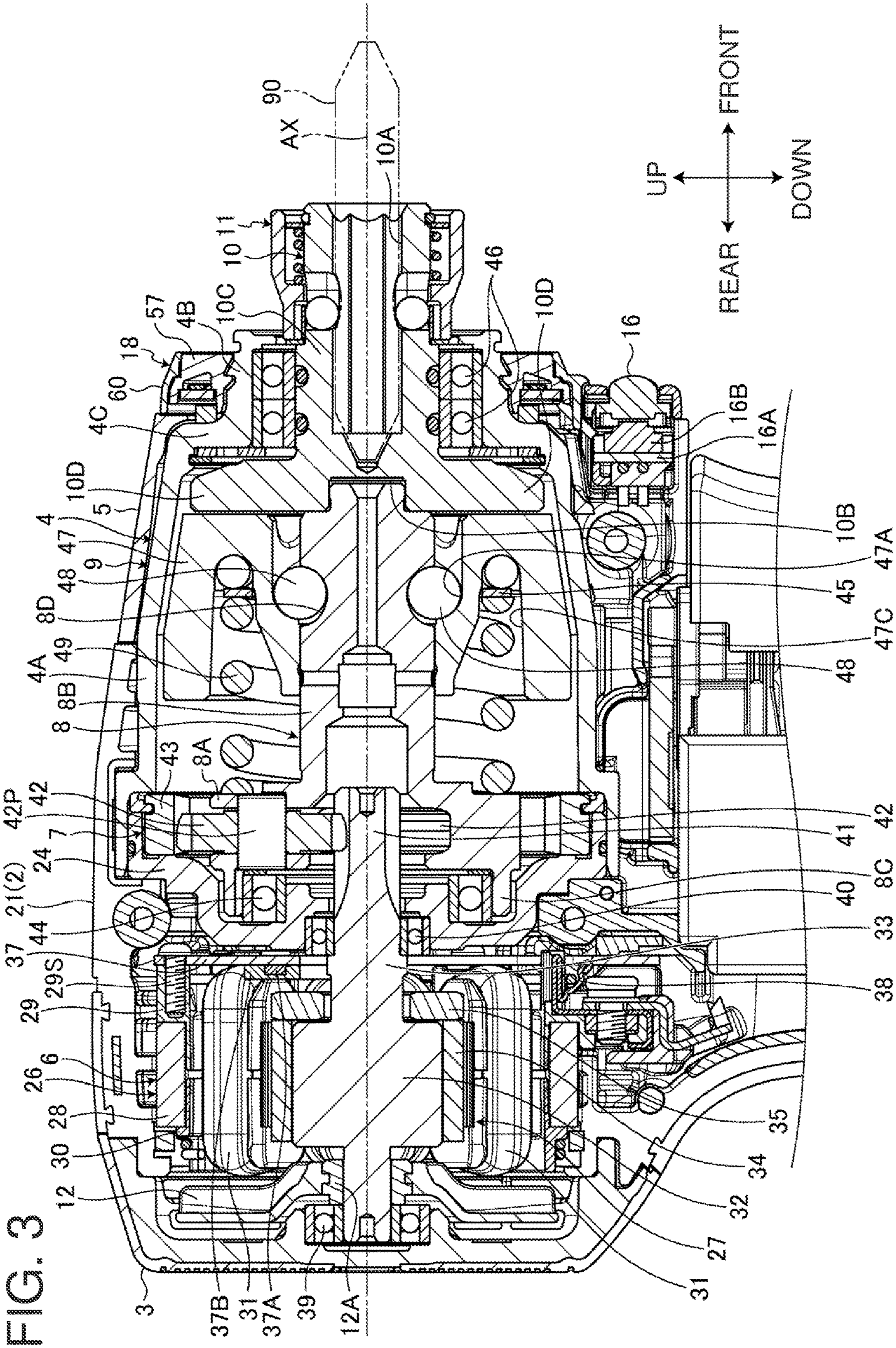
FIG. 3 is a longitudinal sectional view of the upper portion of the electric work machine according to the embodiment.
Figure 4:
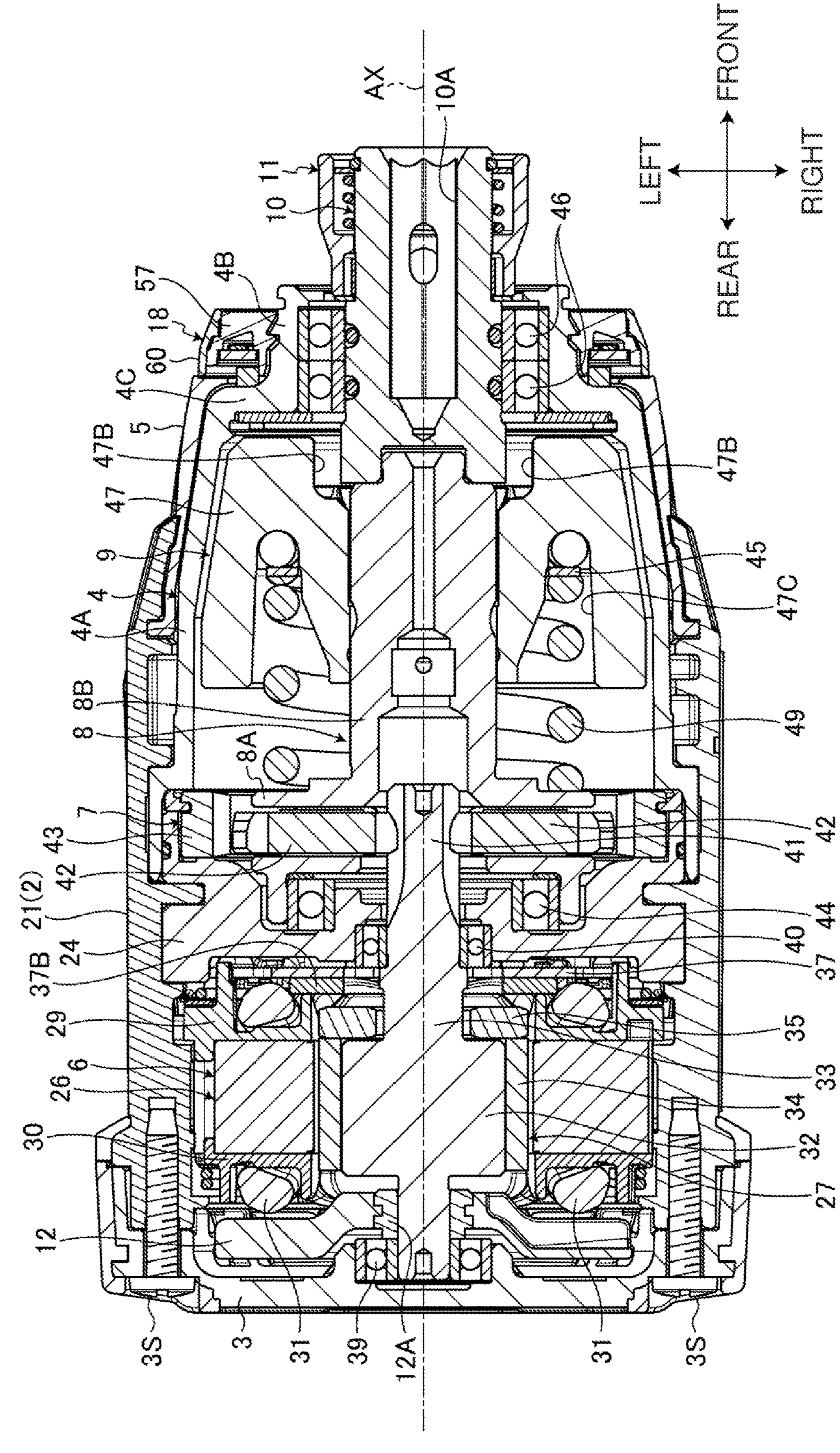
FIG. 4 is a horizontal sectional view of the upper portion of the electric work machine according to the embodiment.

FIG. 1 is a perspective view of an electric work machine 1 according to an embodiment as viewed from the front. FIG. 2 is a side view of an upper portion of the electric work machine 1. FIG. 3 is a longitudinal sectional view of the upper portion of the electric work machine 1. FIG. 4 is a horizontal sectional view of the upper portion of the electric work machine 1.

The electric work machine 1 according to the present embodiment is a power tool including a motor 6 as a power source. A direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outside or radially outward for convenience. The rotation axis AX in the present embodiment extends in the front-rear direction. A first axial direction is from the rear to the front. A second axial direction is from the front to the rear.

The electric work machine 1 according to the present embodiment is an impact tool as an example of a power tool. The electric work machine 1 is hereafter referred to as an impact tool 1 as appropriate.

The impact tool 1 according to the present embodiment is an impact driver as an example of a screwing tool. The impact tool 1 includes a housing 2, a rear cover 3, a hammer case 4, a case cover 5, a motor 6, a reducer 7, a spindle 8, a striker 9, an anvil 10, a tool holder 11, a fan 12, a battery mount 13, a trigger lever 14, a forward-reverse switch lever 15, a hand mode switch button 16, and a light unit 18.

The housing 2 is formed from a synthetic resin. The housing 2 in the present embodiment is formed from nylon. The housing 2 includes a left housing 2L and a right housing 2R. The right housing 2R is located on the right of the left housing 2L. The left housing 2L and the right housing 2R are fastened together with multiple screws 2S. The housing 2 includes a pair of housing halves.

The housing 2 includes a motor compartment 21, a grip 22, and a battery holder 23.

The motor compartment 21 is cylindrical. The motor compartment 21 accommodates the motor 6, a part of a bearing box 24, and a rear portion of the hammer case 4.

The grip 22 protrudes downward from the motor compartment 21. The trigger lever 14 is located in an upper portion of the grip 22. The grip 22 is grippable by an operator.

The battery holder 23 is connected to the lower end of the grip 22. The battery holder 23 has larger outer dimensions than the grip 22 in the front-rear direction and in the lateral direction.

The rear cover 3 is formed from a synthetic resin. The rear cover 3 is located behind the motor compartment 21. The rear cover 3 accommodates at least apart of the fan 12. The fan 12 is located circumferentially inward from the rear cover 3. The rear cover 3 covers an opening in the rear end of the motor compartment 21. The rear cover 3 is fastened to the rear end of the motor compartment 21 with screws 3S.

The motor compartment 21 has inlets 19. The rear cover 3 has outlets 20. Air outside the housing 2 flows into an internal space of the housing 2 through the inlets 19, and then flows out of the housing 2 through the outlets 20.

The hammer case 4 serves as a gear case accommodating the reducer 7. The hammer case 4 accommodates the reducer 7, the spindle 8, the striker 9, and at least a part of the anvil 10. The hammer case 4 is formed from a metal. The hammer case 4 in the present embodiment is formed from aluminum. The hammer case 4 is cylindrical.

The hammer case 4 includes a rear cylinder 4A, a front cylinder 4B, and an annular portion 4C. The front cylinder 4B is located frontward from the rear cylinder 4A. The rear cylinder 4A has a larger outer diameter than the front cylinder 4B. The rear cylinder 4A has a larger inner diameter than the front cylinder 4B. The annular portion 4C connects the front end of the rear cylinder 4A and the rear end of the front cylinder 4B.

The hammer case 4 connects to a front portion of the motor compartment 21. The bearing box 24 is fastened to a rear portion of the rear cylinder 4A. The reducer 7 is at least partially located inside the bearing box 24. The bearing box 24 includes threads on its outer circumference. The rear cylinder 4A has threaded grooves on the inner circumference of the rear portion. The threads on the bearing box 24 are engaged with the threaded grooves on the rear cylinder 4A to fasten the bearing box 24 and the hammer case 4 together. The hammer case 4 is held between the left housing 2L and the right housing 2R. A part of the bearing box 24 and the rear portion of the rear cylinder 4A are accommodated in the motor compartment 21. The bearing box 24 is fixed to the motor compartment 21 and the hammer case 4.

The case cover 5 covers at least a part of the surface of the hammer case 4. The case cover 5 in the present embodiment covers the surface of the rear cylinder 4A. The case cover 5 is formed from a synthetic resin. The case cover 5 in the present embodiment is formed from a polycarbonate resin. The case cover 5 protects the hammer case 4. The case cover 5 prevents contact between the hammer case 4 and objects around the impact tool 1. The case cover 5 prevents contact between the operator and the hammer case 4.

The motor 6 is a power source for the impact tool 1. The motor 6 generates a rotational force. The motor 6 is an electric motor. The motor 6 is an inner-rotor brushless motor. The motor 6 includes a stator 26 and a rotor 27. The stator 26 is supported by the motor compartment 21. The rotor 27 is at least partially located inward from the stator 26. The rotor 27 rotates relative to the stator 26. The rotor 27 rotates about the rotation axis AX extending in the front-rear direction.

The stator 26 includes a stator core 28, a front insulator 29, a rear insulator 30, and multiple coils 31.

The stator core 28 is located radially outward from the rotor 27. The stator core 28 includes multiple steel plates stacked on one another. The steel plates are metal plates formed from iron as a main component. The stator core 28 is cylindrical. The stator core 28 includes multiple teeth to support the coils 31.

The front insulator 29 is located on the front of the stator core 28. The rear insulator 30 is located on the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 in between. The coils 31 surround the teeth on the stator core 28 with the front insulator 29 and the rear insulator 30 in between. The coils 31 and the stator core 28 are electrically insulated from each other with the front insulator 29 and the rear insulator 30. The coils 31 are connected to one another with fusing terminals 38.

The rotor 27 rotates about the rotation axis AX. The rotor 27 includes a rotor core 32, a rotor shaft 33, a rotor magnet 34, and a sensor magnet 35.

The rotor core 32 and the rotor shaft 33 are formed from steel. In the present embodiment, the rotor core 32 and the rotor shaft 33 are integral with each other. The rotor shaft 33 includes a front portion protruding frontward from the front end face of the rotor core 32. The rotor shaft 33 includes a rear portion protruding rearward from the rear end face of the rotor core 32.

The rotor magnet 34 is fixed to the rotor core 32. The rotor magnet 34 is cylindrical. The rotor magnet 34 surrounds the rotor core 32.

The sensor magnet 35 is fixed to the rotor core 32. The sensor magnet 35 is annular. The sensor magnet 35 is located on the front end face of the rotor core 32 and the front end face of the rotor magnet 34.

A sensor board 37 is attached to the front insulator 29. The sensor board 37 is fastened to the front insulator 29 with a screw 29S. The sensor board 37 includes an annular circuit board, a magnetic sensor 37A, and a resin-molded body 37B. The magnetic sensor 37A is supported on the circuit board. The resin-molded body 37B covers the magnetic sensor 37A. The sensor board 37 at least partially faces the sensor magnet 35. The magnetic sensor 37A detects the position of the sensor magnet 35 to detect the position of the rotor 27 in the rotation direction.

The rotor shaft 33 includes the rear portion rotatably supported by a rotor bearing 39. The rotor bearing 39 includes a front portion rotatably supported by a rotor bearing 40. The rotor bearing 39 is held by the rear cover 3. The rotor bearing 40 is held by the bearing box 24. The front end of the rotor shaft 33 is located in an internal space of the hammer case 4 through an opening in the bearing box 24.

A pinion gear 41 is located on the front end of the rotor shaft 33. The pinion gear 41 is connected to at least a part of the reducer 7. The rotor shaft 33 is connected to the reducer 7 with the pinion gear 41.

The reducer 7 transmits a rotational force from the motor 6 to the spindle 8 and the anvil 10. The reducer 7 is accommodated in the rear cylinder 4A in the hammer case 4. The reducer 7 includes multiple gears. The reducer 7 is located frontward from the motor 6. The reducer 7 connects the rotor shaft 33 and the spindle 8 together. The rotor 27 drives the gears in the reducer 7. The reducer 7 transmits rotation of the rotor 27 to the spindle 8. The reducer 7 rotates the spindle 8 at a lower rotational speed than the rotor shaft 33. The reducer 7 includes a planetary gear assembly.

The reducer 7 includes multiple planetary gears 42 and an internal gear 43. The planetary gears 42 surround the pinion gear 41. The internal gear 43 surrounds the planetary gears 42. The pinion gear 41, the planetary gears 42, and the internal gear 43 are accommodated in the hammer case 4 and the bearing box 24. Each planetary gear 42 meshes with the pinion gear 41. The planetary gears 42 are rotatably supported by the spindle 8 with a pin 42P. The spindle 8 is rotated by the planetary gears 42. The internal gear 43 includes internal teeth that mesh with the planetary gears 42. The internal gear 43 is fixed to the bearing box 24. The internal gear 43 is constantly nonrotatable relative to the bearing box 24.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The revolving planetary gears 42 rotate the spindle 8 connected to the planetary gears 42 with the pin 42P at a lower rotational speed than the rotor shaft 33.

The spindle 8 rotates with a rotational force from the motor 6. The spindle 8 is located frontward from at least a part of the motor 6. The spindle 8 is located frontward from the stator 26. The spindle 8 is at least partially located frontward from the rotor 27. The spindle 8 is at least partially located in front of the reducer 7. The spindle 8 is rotated by the rotor 27. The spindle 8 rotates with a rotational force from the rotor 27 transmitted by the reducer 7.

The spindle 8 includes a flange 8A and a spindle shaft 8B. The spindle shaft 8B protrudes frontward from the flange 8A. The planetary gears 42 are rotatably supported by the flange 8A with the pin 42P. The rotation axis of the spindle 8 aligns with the rotation axis AX of the motor 6. The spindle 8 rotates about the rotation axis AX.

The spindle 8 is rotatably supported by a spindle bearing 44. The spindle bearing 44 is held by the bearing box 24. The spindle 8 includes a ring portion 8C protruding rearward from the rear of the flange 8A. The spindle bearing 44 is located inward from the ring portion 8C. In the present embodiment, the spindle bearing 44 includes an outer ring connected to the ring portion 8C and an inner ring supported by the bearing box 24.

The striker 9 is driven by the motor 6. A rotational force from the motor 6 is transmitted to the striker 9 through the reducer 7 and the spindle 8. The striker 9 strikes the anvil 10 in the rotation direction in response to the rotational force of the spindle 8 rotated by the motor 6. The striker 9 includes a hammer 47, balls 48, and a coil spring 49. The striker 9 including the hammer 47 is accommodated in the hammer case 4.

The hammer 47 is located frontward from the reducer 7. The hammer 47 is accommodated in the rear cylinder 4A. The hammer 47 surrounds the spindle shaft 8B. The hammer 47 is held by the spindle shaft 8B. The balls 48 are between the spindle shaft 8B and the hammer 47. The coil spring 49 is supported by the flange 8A and the hammer 47.

The hammer 47 is rotated by the motor 6. A rotational force from the motor 6 is transmitted to the hammer 47 through the reducer 7 and the spindle 8. The hammer 47 is rotatable together with the spindle 8 in response to the rotational force of the spindle 8 rotated by the motor 6. The rotation axis of the hammer 47 and the rotation axis of the spindle 8 align with the rotation axis AX of the motor 6. The hammer 47 rotates about the rotation axis AX.

The balls 48 are formed from a metal such as steel. The balls 48 are between the spindle shaft 8B and the hammer 47. The spindle 8 has a spindle groove 8D. The spindle groove 8D receives at least parts of the balls 48. The spindle groove 8D is on the outer circumferential surface of the spindle shaft 8B. The hammer 47 has a hammer groove 47A. The hammer groove 47A receives at least parts of the balls 48. The hammer groove 47A is on the inner surface of the hammer 47. The balls 48 are between the spindle groove 8D and the hammer groove 47A. The balls 48 can roll along the spindle groove 8D and the hammer groove 47A. The hammer 47 is movable together with the balls 48. The spindle 8 and the hammer 47 are movable relative to each other in the axial direction and in the rotation direction within a movable range defined by the spindle groove 8D and the hammer groove 47A.

The coil spring 49 generates an elastic force for moving the hammer 47 forward. The coil spring 49 is between the flange 8A and the hammer 47. An annular recess 47C is located on the rear surface of the hammer 47. The recess 47C is recessed frontward from the rear surface of the hammer 47. A washer 45 is received in the recess 47C. The rear end of the coil spring 49 is supported by the flange 8A. The front end of the coil spring 49 is received in the recess 47C and supported by the washer 45.

The anvil 10 is an output unit of the impact tool 1 that operates with a rotational force from the motor 6. The anvil 10 rotates with a rotational force from the motor 6. The anvil 10 is at least partially located frontward from the hammer 47. The anvil 10 has a tool hole 10A to receive a tip tool 90. The tip tool 90 is, for example, a screwdriver bit. The anvil 10 has the tool hole 10A in its front end. The tip tool 90 is attached to the anvil 10. The anvil 10 has a recess 10B on its rear end. The spindle shaft 8B includes a protrusion on its front end. The recess 10B on the rear end of the anvil 10 receives the protrusion on the front end of the spindle shaft 8B.

The anvil 10 includes a rod-like anvil shaft 10C and anvil projections 10D. The tool hole 10A is located in the front end of the anvil shaft 10C. The tip tool 90 is attached to the anvil shaft 10C. The anvil projections 10D are located on the rear end of the anvil 10. The anvil projections 10D protrude radially outward from the rear end of the anvil shaft 10C.

The anvil 10 is rotatably supported by anvil bearings 46. The rotation axis of the anvil 10, the rotation axis of the hammer 47, and the rotation axis of the spindle 8 align with the rotation axis AX of the motor 6. The anvil 10 rotates about the rotation axis AX. The anvil bearings 46 are located inward from the front cylinder 4B. The anvil bearings 46 are held by the front cylinder 4B in the hammer case 4. The anvil bearings 46 support the anvil shaft 10C. In the present embodiment, two anvil bearings 46 are arranged in the front-rear direction.

The hammer 47 includes hammer projections 47B protruding frontward. The hammer projections 47B can come in contact with the anvil projections 10D. When the motor 6 operates with the hammer projections 47B and the anvil projections 10D in contact with each other, the anvil 10 rotates together with the hammer 47 and the spindle 8.

The anvil 10 is strikable by the hammer 47 in the rotation direction. When, for example, the anvil 10 receives a higher load in a screwing operation, the anvil 10 may fail to rotate with power generated by the motor 6 alone. This stops rotation of the anvil 10 and the hammer 47. The spindle 8 and the hammer 47 are movable relative to each other in the axial direction and in the circumferential direction with the balls 48 in between. When the hammer 47 stops rotating, the spindle 8 continues to rotate with power generated by the motor 6. When the hammer 47 stops rotating and the spindle 8 rotates, the balls 48 move backward as being guided along the spindle groove 8D and the hammer groove 47A. The hammer 47 receives a force from the balls 48 to move backward with the balls 48. In other words, the hammer 47 moves backward when the anvil 10 stops rotating and the spindle 8 rotates. Thus, the hammer projections 47B and the anvil projections 10D come out of contact with each other.

The coil spring 49 generates an elastic force for moving the hammer 47 forward. The hammer 47 that has moved backward then moves forward under the elastic force from the coil spring 49. When moving forward, the hammer 47 receives a force in the rotation direction from the balls 48. In other words, the hammer 47 moves forward while rotating. The hammer projections 47B then come in contact with the anvil projections 10D while rotating. Thus, the anvil projections 10D are struck by the hammer projections 47B in the rotation direction. The anvil 10 receives power from the motor 6 and an inertial force from the hammer 47. The anvil 10 thus rotates at high torque about the rotation axis AX.

The tool holder 11 surrounds a front portion of the anvil 10. The tool holder 11 holds the tip tool 90 received in the tool hole 10A.

The fan 12 rotates with a rotational force from the motor 6. The fan 12 is located rearward from the stator 26 in the motor 6. The fan 12 generates an airflow for cooling the motor 6. The fan 12 is fastened to at least a part of the rotor 27. The fan 12 is fastened to the rear portion of the rotor shaft 33 with a bush 12A. The fan 12 is between the rotor bearing 39 and the stator 26. The fan 12 rotates as the rotor 27 rotates. As the rotor shaft 33 rotates, the fan 12 rotates together with the rotor shaft 33. Air outside the housing 2 thus flows into the internal space of the housing 2 through the inlets 19 to cool the motor 6. As the fan 12 rotates, the air passing through the internal space of the housing 2 flows out of the housing 2 through the outlets 20.

The battery mount 13 is located in a lower portion of the battery holder 23. A battery pack 25 is attached to the battery mount 13 in a detachable manner. The battery pack 25 serves as a power supply for the impact tool 1. The battery pack 25 includes a secondary battery. The battery pack 25 in the present embodiment includes a rechargeable lithium-ion battery. The battery pack 25 is attached to the battery mount 13 to power the impact tool 1. The motor 6 and the light unit 18 are each driven by power supplied from the battery pack 25.

The trigger lever 14 is located on the grip 22. The trigger lever 14 is operable by the operator to activate the motor 6. The trigger lever 14 is operable to switch the motor 6 between the driving state and the stopped state.

The forward-reverse switch lever 15 is located above the grip 22. The forward-reverse switch lever 15 is operable by the operator. The forward-reverse switch lever 15 is operable to switch the rotation direction of the motor 6 between forward and reverse. This switches the rotation direction of the spindle 8.

The hand mode switch button 16 is located above the trigger lever 14. The hand mode switch button 16 is operable by the operator. A circuit board 16A and a switch 16B are located behind the hand mode switch button 16. The switch 16B is mounted on the front surface of the circuit board 16A. The hand mode switch button 16 is located in front of the switch 16B. When the hand mode switch button 16 is pushed backward, the switch 16B operates to cause the circuit board 16A to output an operation signal. The operation signal output from the circuit board 16A is transmitted to a controller (not shown). The controller changes the control mode of the motor 6 in response to the operation signal output from the circuit board 16A.

Light Unit

Figure 5:
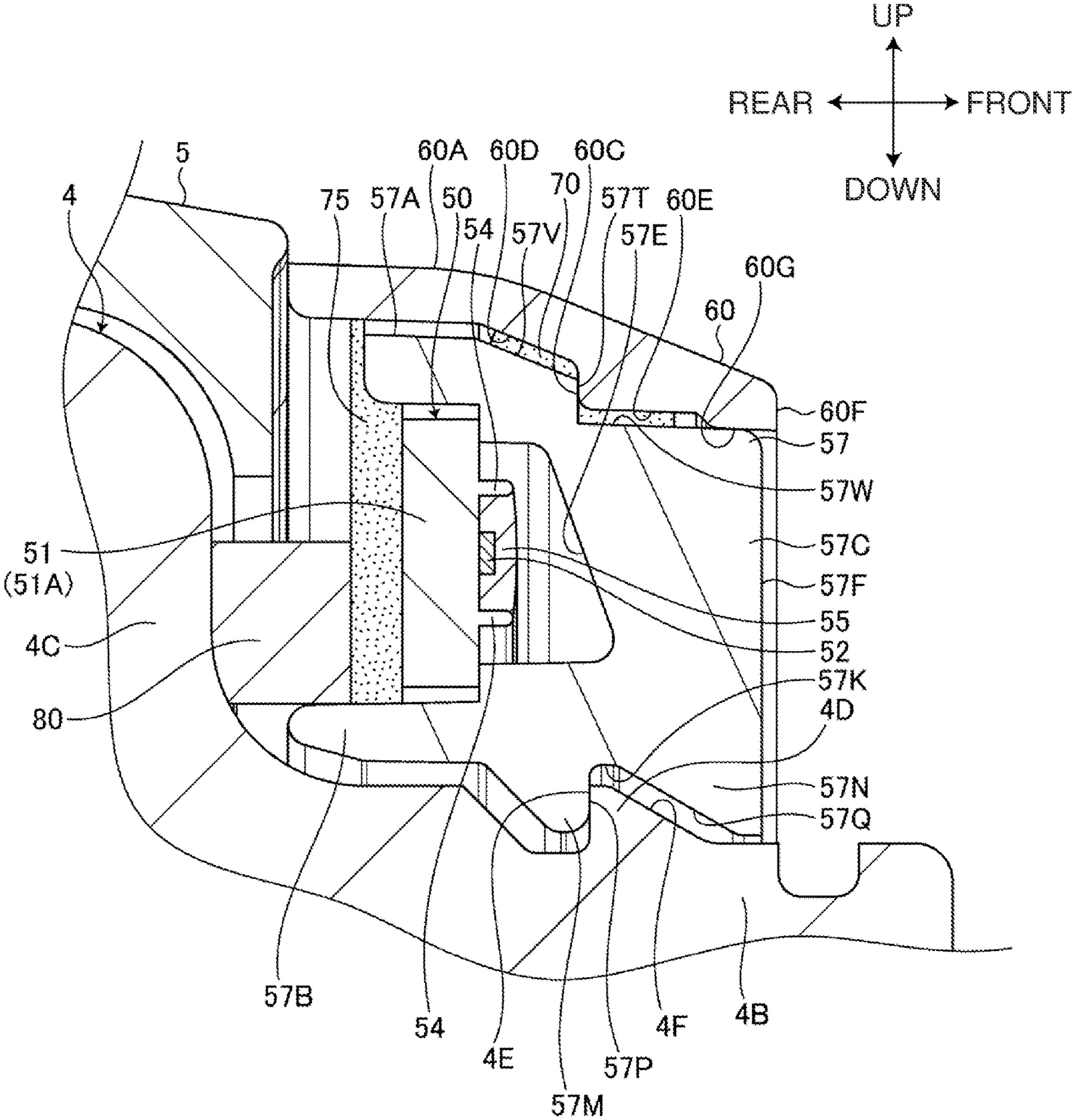
FIG. 5 is a partial sectional view of a light unit in the embodiment.
Figure 6:
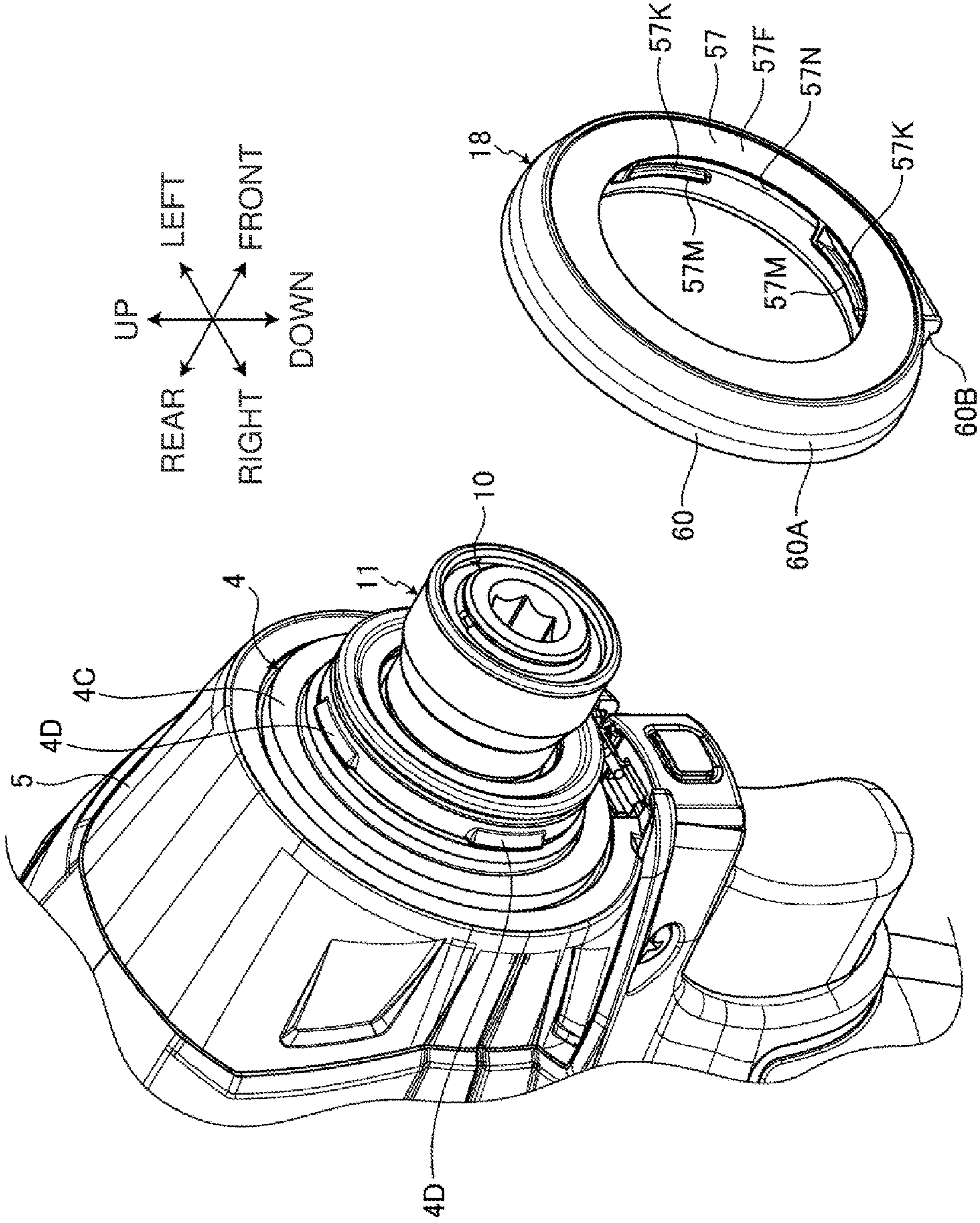
FIG. 6 is an exploded perspective view of the upper portion of the electric work machine according to the embodiment as viewed from the front.
Figure 7:
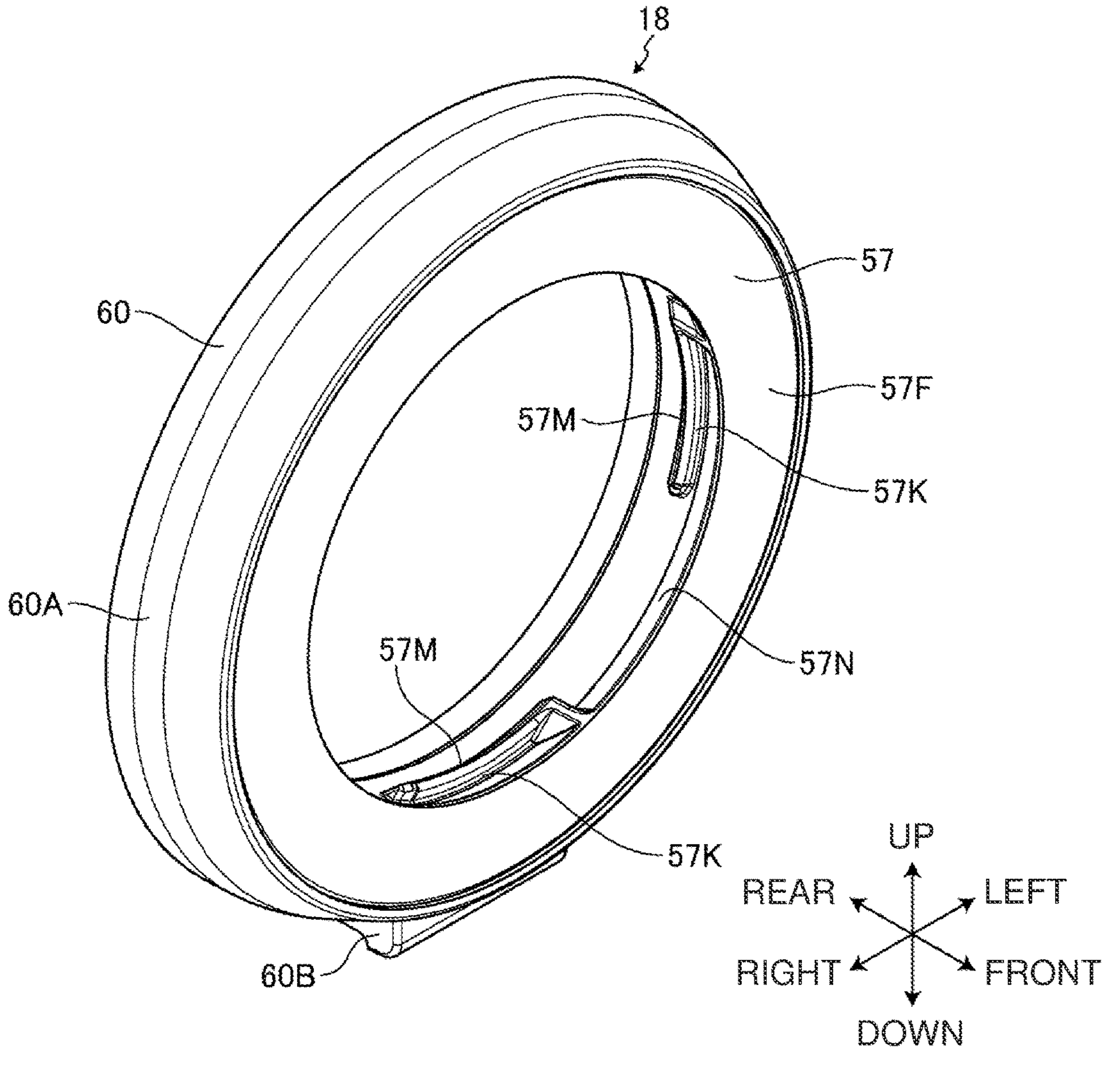
FIG. 7 is a perspective view of the light unit in the embodiment as viewed from the front.
Figure 8:
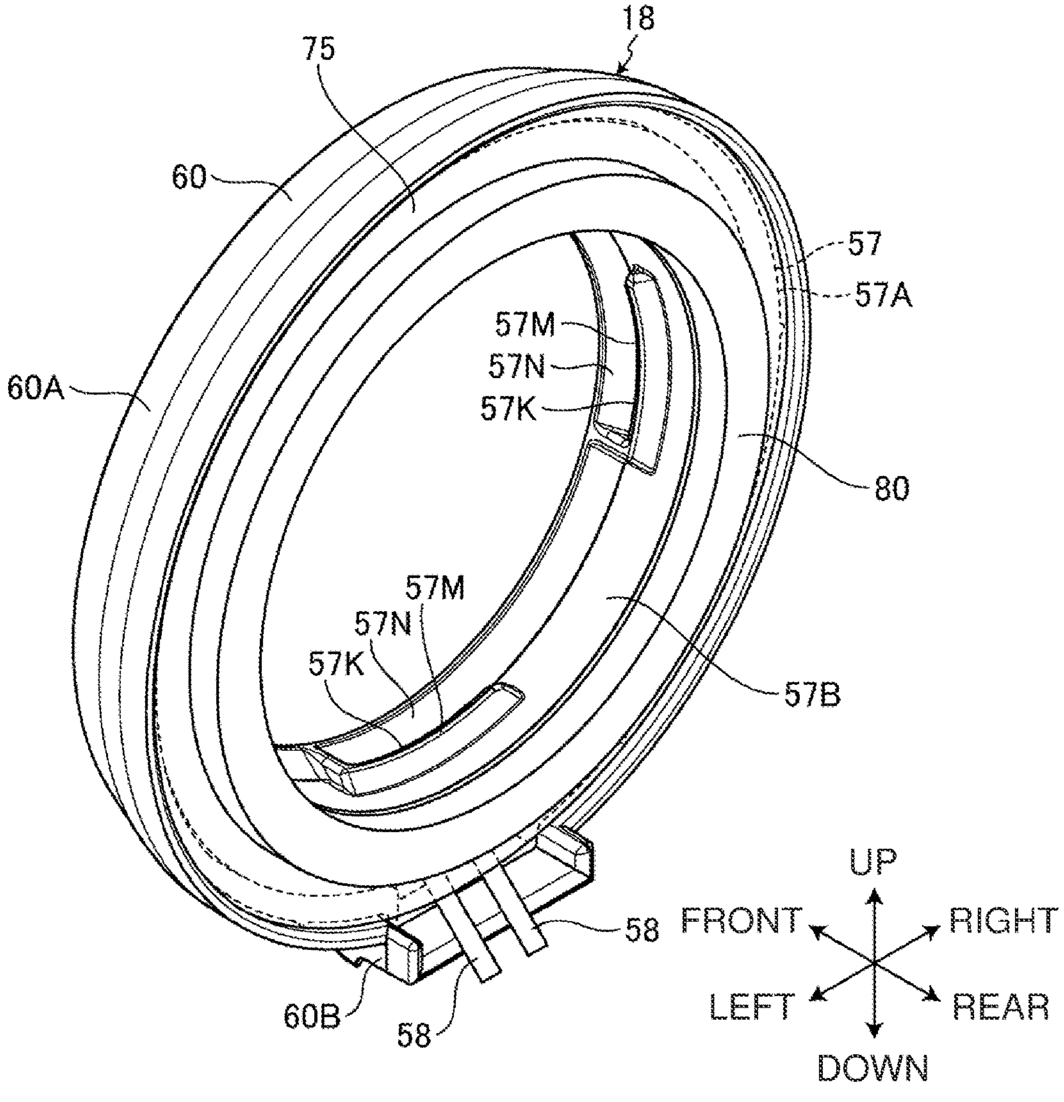
FIG. 8 is a perspective view of the light unit in the embodiment as viewed from the rear.
Figure 9:
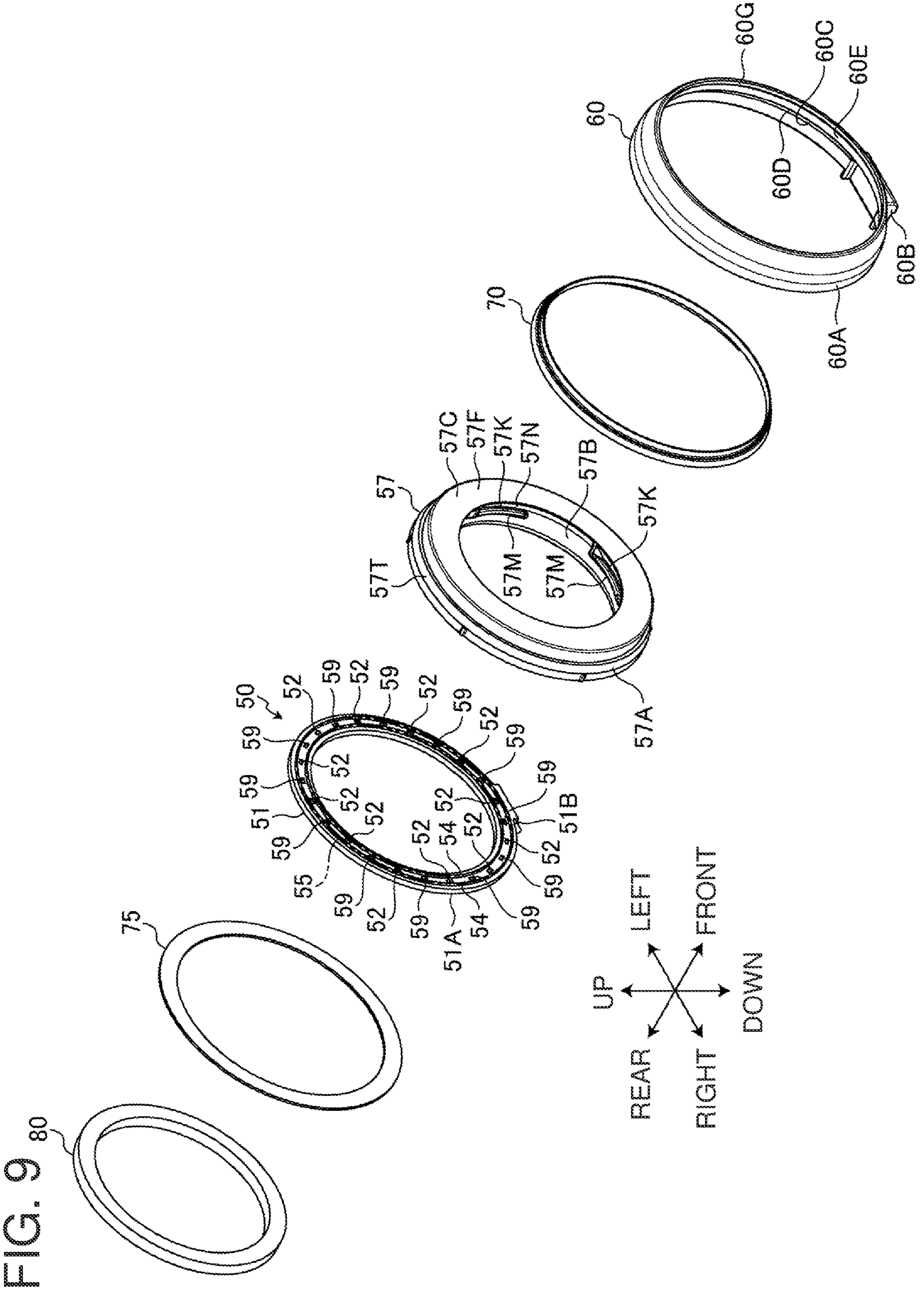
FIG. 9 is an exploded perspective view of the light unit in the embodiment as viewed from the front.
Figure 10:
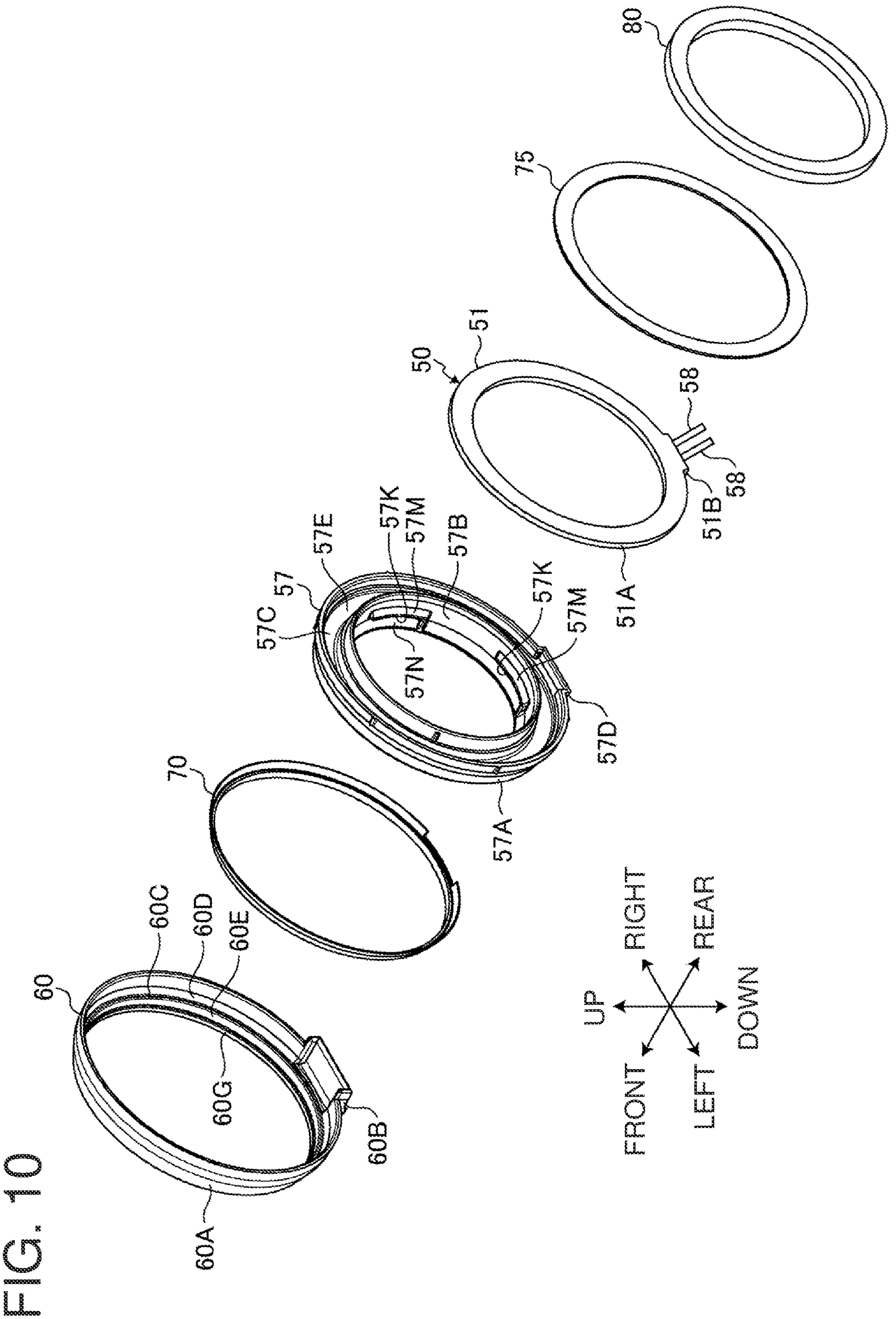
FIG. 10 is an exploded perspective view of the light unit in the embodiment as viewed from the rear.

FIG. 5 is a partial sectional view of the light unit 18 in the present embodiment. FIG. 6 is an exploded perspective view of the upper portion of the impact tool 1 as viewed from the front. FIG. 7 is a perspective view of the light unit 18 as viewed from the front. FIG. 8 is a perspective view of the light unit 18 as viewed from the rear. FIG. 9 is an exploded perspective view of the light unit 18 as viewed from the front. FIG. 10 is an exploded perspective view of the light unit 18 as viewed from the rear.

The light unit 18 emits illumination light. The light unit 18 illuminates the anvil 10 and an area around the anvil 10 with illumination light. The light unit 18 illuminates an area ahead of the anvil 10 with illumination light. The light unit 18 also illuminates the tip tool 90 attached to the anvil 10 and an area around the tip tool 9) with illumination light.

The light unit 18 is located at the front of the hammer case 4. The light unit 18 surrounds the front cylinder 4B. The light unit 18 surrounds the anvil shaft 10C with the front cylinder 4B in between.

The light unit 18 includes a chip-on-board (COB) light-emitting diode (LED) 50.

The COB LED 50 includes a substrate 51, LED chips 52 being light emitters, banks 54, and a phosphor 55. The substrate 51 is, for example, an aluminum substrate, a glass fabric base epoxy resin substrate (flame retardant 4, or FR-4, substrate), or a composite base epoxy resin substrate (composite epoxy material 3, or CEM-3, substrate). The LED chips 52 are mounted on the front surface of the substrate 51. The LED chips 52 are connected to the substrate 51 with gold wires (not shown). The gold wires interconnect the multiple LED chips 52. The banks 54 are located on the front surface of the substrate 51. The banks 54 surround the LED chips 52. One bank 54 is located radially inward from the LED chips 52, and the other bank 54 is located radially outward from the LED chips 52. The banks 54 define a space for the phosphor 55. The phosphor 55 covers the LED chips 52 between the banks 54. A pair of electrodes (not shown) are located outside the banks 54 on the front surface of the substrate 51. The electrodes may be located on the back surface of the substrate 51. The pair of electrodes are a positive electrode and a negative electrode. Power output from the battery pack 25 is supplied to the electrodes. The power supplied to the electrodes is supplied to the LED chips 52 through the substrate 51 and the gold wires. The LED chips 52 emit light with power supplied from the battery pack 25. The voltage of the battery pack 25 is decreased to 5 V by the controller (not shown) and applied to the LED chips 52.

The light unit 18 includes the COB LED 50, an optical member 57, and a light shield 60. The COB LED 50 includes the substrate 51, the multiple LED chips 52, the banks 54, and the phosphor 55.

The substrate 51 is annular. The substrate 51 surrounds the anvil shaft 10C with the front cylinder 4B in between. The substrate 51 includes a ring portion 51A and a support 51B. The support 51B protrudes downward from a lower portion of the ring portion 51A.

The LED chips 52 are located on the front surface of the ring portion 51A in the substrate 51. The LED chips 52 at least partially surround the anvil shaft 10C with the front cylinder 4B in between. The multiple (twelve in the present embodiment) LED chips 52 are arranged at equal intervals in the circumferential direction of the ring portion 51A. The LED chips 52 are at angular positions of 0°, 30°, 60°, 90°, 120° 150°, 180°, 210°, 240°, 270°, 300°, and 330° about the rotation axis AX. The angular position of 0° is immediately above the rotation axis AX (anvil shaft 10C). The angular position of 180° is immediately below the rotation axis AX (anvil shaft 10C).

A resistor 59 is located between two adjacent LED chips 52.

The banks 54 are located on the front surface of the ring portion 51A in the substrate 51. The banks 54 protrude frontward from the front surface of the ring portion 51A. The banks 54 define the space for the phosphor 55. The banks 54 are annular. The banks 54 in the present embodiment have a double annular structure. More specifically, the banks 54 in the present embodiment include a first bank 54 and a second bank 54. The first bank 54 is annular and located on the front surface of the ring portion 51A. The second bank 54 is annular and is located radially outward from the first bank 54 on the front surface of the ring portion 51A. The first bank 54 is located radially inward from the LED chips 52. The second bank 54 is located radially outward from the LED chips 52. The LED chips 52 are between the first bank 54 and the second bank 54.

The phosphor 55 is located on the front surface of the ring portion 51A in the substrate 51. The phosphor 55 is annular. The phosphor 55 covers the LED chips 52 between the first bank 54 and the second bank 54.

A pair of lead wires 58 are connected to the substrate 51. The lead wires 58 are connected to the electrodes described above. The pair of lead wires 58 are supported on the rear surface of the support 51B. The lead wires 58 may be supported on the front surface of the support 51B.

A current output from the battery pack 25 is supplied to the electrodes through the controller (not shown) and the lead wires 58. The voltage of the battery pack 25 is decreased by the controller (not shown) and applied to the electrodes. The current supplied to the electrodes is supplied to the LED chip 52 through the substrate 51 and the gold wires. The LED chips 52 emit light with the current supplied from the battery pack 25.

The optical member 57 is connected to the COB LED 50. The optical member 57 is fixed to the substrate 51. The optical member 57 is formed from a polycarbonate resin. The optical member 57 in the present embodiment is formed from a polycarbonate resin containing a white diffusion material. The optical member 57 is at least partially located frontward from the COB LED 50. The optical member 57 includes an outer cylinder 57A, an inner cylinder 57B, a light transmitter 57C, and a protrusion 57D.

The outer cylinder 57A is located radially outward from the inner cylinder 57B. The outer cylinder 57A is located radially outward from the LED chips 52. The COB LED 50 is at least partially located between the outer cylinder 57A and the inner cylinder 57B in the radial direction. The outer cylinder 57A is located radially outward from the ring portion 51A in the substrate 51. The inner cylinder 57B is located radially inward from the ring portion 51A in the substrate 51. The inner cylinder 57B is located radially inward from the LED chips 52.

The light transmitter 57C is annular. The light transmitter 57C is located frontward from the LED chips 52. The light transmitter 57C connects the front end of the outer cylinder 57A and the front end of the inner cylinder 57B. The light transmitter 57C faces the front surface of the ring portion 51A. The light transmitter 57C faces the LED chips 52. Light emitted from the LED chips 52 passes through the light transmitter 57C and illuminates an area ahead of the light unit 18.

The light transmitter 57C has an incident surface 57E and an emission surface 57F. Light from the LED chips 52 enters the incident surface 57E. The light passing through the light transmitter 57C is emitted through the emission surface 57F. The front surface of the ring portion 51A faces the incident surface 57E of the light transmitter 57C. The incident surface 57E faces the LED chips 52. The incident surface 57E faces substantially rearward. The emission surface 57F faces substantially frontward.

The protrusion 57D protrudes downward from a lower portion of the outer cylinder 57A. The protrusion 57D defines an accommodation space inside. The support 51B in the substrate 51 is received in the accommodation space inside the protrusion 57D.

The light shield 60 is located radially outward from the outer cylinder 57A in the optical member 57. The light shield 60 has a lower light transmittance than the optical member 57. Light emitted from the LED chips 52 may at least partially pass through the outer cylinder 57A. The light shield 60 blocks light from the LED chips 52 emitted through the outer circumferential surface of the outer cylinder 57A. The light shield 60 reduces the likelihood that light from the LED chips 52 emitted through the outer circumferential surface of the outer cylinder 57A illuminates an area around the optical member 57.

The light shield 60 is formed from a synthetic resin. The light shield 60 in the present embodiment is formed from a polycarbonate resin. The light shield 60 is formed from a polycarbonate resin containing a colored pigment. The colored pigment is, for example, a black pigment or a gray pigment. The light shield 60 in the present embodiment is formed from a polycarbonate resin containing a black pigment. The light shield 60 is black. The light shield 60 may be formed from a polycarbonate resin containing a gray pigment. The light shield 60 may be gray.

The light shield 60 includes a cylinder 60A and a protrusion 60B. The cylinder 60A surrounds the outer cylinder 57A. The cylinder 60A covers the outer circumferential surface of the outer cylinder 57A. The protrusion 60B protrudes downward from a lower portion of the cylinder 60A. The protrusion 60B covers the outer surface of the protrusion 57D. The protrusion 60B covers the protrusion 57D from below.

The light shield 60 is fixed to the optical member 57. In the present embodiment, the optical member 57 and the light shield 60 are fixed together with a first adhesive 70. The first adhesive 70 is between the outer circumferential surface of the outer cylinder 57A and the inner circumferential surface of the cylinder 60A.

The light shield 60 in the present embodiment has grooves 60D and 60E. The grooves 60D and 60E are recessed radially outward from the inner circumferential surface of the cylinder 60A. The groove 60D is located rearward from the groove 60E. An abutment surface 60C is located at the boundary between the grooves 60D and 60E in the front-rear direction. The abutment surface 60C faces rearward. The abutment surface 60C is annular. The optical member 57 has a facing surface 57T facing the abutment surface 60C. The optical member 57 has grooves 57V and 57W. The grooves 57V and 57W are recessed radially inward from the outer circumferential surface of the optical member 57. The groove 57V is located rearward from the groove 57W. The facing surface 57T is located at the boundary between the grooves 57V and 57W. The facing surface 57T faces frontward. The abutment surface 60C and the facing surface 57T are in contact with each other. The first adhesive 70 fills the grooves 60D and 60E. The first adhesive 70 fills the grooves 57V and 57W. The first adhesive 70 is retained in a space between the groove 60D and the groove 57V and a space between the groove 60E and the groove 57W. The optical member 57 and the light shield 60 are fixed together with the first adhesive 70 filling the grooves 57V and 57W.

The light shield 60 includes a protrusion 60G. The protrusion 60G is located frontward from the grooves 60D, 60E, 57V, and 57W and protrudes radially inward from the inner circumferential surface of the cylinder 60A. The protrusion 60G has an inner end in the radial direction in contact with the outer circumferential surface of the optical member 57. The protrusion 60G surrounds the optical member 57. The optical member 57 is fitted to the inner circumference of the protrusion 60G.

The light shield 60 has a front end 60F surrounding the emission surface 57F of the light transmitter 57C. The front end 60F of the light shield 60 is located frontward from the front end of the light transmitter 57C. The front end 60F of the light shield 60 may be aligned with the front end of the light transmitter 57C in the front-rear direction. In this structure, light is less likely to leak radially outward from the optical member 57.

The light unit 18 including the COB LED 50 and the light shield 60 surrounds the anvil shaft 10C in the anvil 10. The light unit 18 surrounds the front cylinder 4B in the hammer case 4. The inner cylinder 57B in the optical member 57 surrounds the front cylinder 4B in the hammer case 4. The inner cylinder 57B in the optical member 57 is supported on the front cylinder 4B in the hammer case 4. The inner cylinder 57B in the optical member 57 is fixed to the front cylinder 4B in the hammer case 4 in a manner immovable in the axial direction.

The substrate 51 is between the outer cylinder 57A and the inner cylinder 57B in the radial direction. The substrate 51 is fixed to the optical member 57. As shown in FIG. 5, the substrate 51 and the optical member 57 are fixed together with a second adhesive 75. The second adhesive 75 fixes the rear surface of the substrate 51 and the inner circumferential surface of the outer cylinder 57A together. The second adhesive 75 may fix the rear surface of the substrate 51 and the outer circumferential surface of the inner cylinder 57B together. The second adhesive 75 is light-shielding. The second adhesive 75 in the present embodiment is a black adhesive.

As shown in FIGS. 5 and 6, the front cylinder 4B includes multiple protrusions 4D on its outer circumferential surface. The protrusions 4D protrude radially outward from the outer circumferential surface of the front cylinder 4B. The multiple (four in the present embodiment) protrusions 4D are arranged at intervals in the circumferential direction. Each protrusion 4D has a surface including a rear surface 4E and a slope 4F. The rear surface 4E faces rearward. The slope 4F slopes radially inward toward the front.

The light unit 18 is supported on the front cylinder 4B in the hammer case 4. The optical member 57 includes, on the inner circumference surface of the inner cylinder 57B, rear slides 57M and front slides 57N. The rear slides 57M and the front slides 57N protrude radially inward from the inner circumferential surface of the inner cylinder 57B. The front slides 57N are located frontward from the rear slides 57M. Four rear slides 57M are arranged at intervals in the circumferential direction. The front slides 57N are located in front of the four rear slides 57M. A recess 57K is between each rear slide 57M and the corresponding front slide 57N. The protrusions 4D are received in the recesses 57K. Each rear slide 57M has a front surface 57P in contact with the rear surface 4E of the corresponding protrusion 4D. Each front slide 57N has a slope 57Q facing the slope 4F of the corresponding protrusion 4D.

An insertion opening is between an end of each rear slide 57M in a first circumferential direction and the corresponding front slide 57N. The protrusions 4D are received in the recesses 57K through the insertion openings. The protrusions 4D are placed through the insertion openings, and then the light unit 18 is rotated. This causes the protrusions 4D to be received in the recesses 57K. The optical member 57 and the front cylinder 4B in the hammer case 4 are thus fixed together. This fixes the light unit 18 and the hammer case 4 together.

Light emitted from the LED chips 52 enters the incident surface 57E through the phosphor 55. As shown in, for example. FIG. 5, the incident surface 57E slopes radially inward toward the front. Light incident on the incident surface 57E passes through the light transmitter 57C and is emitted through the emission surface 57F.

Light incident on the incident surface 57E at least partially reaches the slopes 57Q. The slopes 57Q slope radially inward toward the front. Light reaching the slopes 57Q is fully reflected from the slopes 57Q, travels forward, and is emitted through the emission surface 57F.

In the present embodiment, a sponge ring 80 is located behind the COB LED 50. The sponge ring 80 has a rear surface supported on the annular portion 4C in the hammer case 4. The sponge ring 80 is at least partially compressed and in contact with the light unit 18. In the example shown in FIG. 5, the sponge ring 80 is in contact with the inner cylinder 57B in the optical member 57 and the second adhesive 75. The light unit 18 is supported on the compressed sponge ring 80 and is thus less likely to rattle relative to the hammer case 4. The sponge ring 80 may support the inner cylinder 57B.

Assembly Method

To assemble the light unit 18, the light shield 60 is first attached to the optical member 57. The optical member 57 is placed on a predetermined support surface with the emission surface 57F facing upward. The first adhesive 70 is then applied to the outer circumferential surface of the optical member 57 including the facing surface 57T. In the present embodiment, the first adhesive 70 is applied to the grooves 57V and 57W. The light shield 60 is then placed onto the optical member 57 from above the optical member 57. The first adhesive 70 may be applied to the grooves 60D and 60E on the light shield 60, and then the light shield 60 may be placed onto the optical member 57.

When the light shield 60 is placed onto the optical member 57, the abutment surface 60C and the facing surface 57T come in contact with each other. A front portion of the optical member 57 is fitted to the protrusion 60G. The optical member 57 is lightly press-fitted to the inner circumference of the protrusion 60G. This causes the first adhesive 70 to wet and spread in the grooves 57V and 57W. The first adhesive 70 applied to the grooves 57V and 57W is less likely to move upward, and thus does not reach the emission surface 57F when the light shield 60 is placed onto the optical member 57. The inner end of the protrusion 60G in the radial direction coming in contact with the outer circumferential surface of the optical member 57 also prevents the first adhesive 70 applied to the grooves 57V and 57W from reaching the emission surface 57F. The first adhesive 70 may at least partially flow between a rear end portion (lower end portion) of the outer cylinder 57A in the optical member 57 and a rear end portion of the inner circumferential surface of the light shield 60, but does not flow to the emission surface 57F. The first adhesive 70 is thus less likely to stain the emission surface 57F. The first adhesive 70 does not adhere to the emission surface 57F and is thus less likely to block light to be emitted through the emission surface 57F. The substrate 51 and the optical member 57 are fixed together with the second adhesive 75.

Once the optical member 57, the light shield 60, and the COB LED 50 are fixed together with the first adhesive 70 and the second adhesive 75, the light unit 18 and the hammer case 4 are fixed together. As described above, the protrusions 4D are placed through the insertion openings between the ends of the rear slides 57M in the first circumferential direction and the corresponding front slides 57N, and then the light unit 18 is rotated. This causes the protrusions 4D to be received in the recesses 57K. This fixes the light unit 18 and the hammer case 4 together. The light unit 18 is at least partially in contact with the sponge ring 80 supported on the annular portion 4C and is thus less likely to rattle relative to the hammer case 4. With the inner cylinder 57B in the optical member 57 fixed to the front cylinder 4B in the hammer case 4, the light unit 18 is fixed to the hammer case 4 in the axial direction alone. The hammer case 4 and the protrusion 60B on the light shield 60 are then held between the left housing 2L and the right housing 2R. This fixes the hammer case 4 and the light unit 18 to the housing 2 in the rotation direction. The left housing 2L and the right housing 2R are then fastened together with the screws 2S.

Method of Use

The operator operates the trigger lever 14 to activate the motor 6 and cause the LED chips 52 in the COB LED 50 to emit light. The COB LED 50 emits light with high luminance and brightly illuminates a workpiece.

When light emitted from the LED chips 52 at least partially passes through the outer cylinder 57A, such light emitted through the outer circumferential surface of the outer cylinder 57A may reach the eyes of the operator and cause glare to the operator. This may lower the visibility of a workpiece by the operator. In the present embodiment, the light shield 60 reduces glare to the operator.

As described above, the impact tool 1 according to the present embodiment includes the motor 6, the anvil 10 as an output unit, the LED chips 52, the optical member 57, and the light shield 60. The anvil 10 operates with a rotational force from the motor 6. The LED chips 52 at least partially surround the anvil 10. The optical member 57 includes the outer cylinder 57A and the light transmitter 57C. The outer cylinder 57A is located radially outward from the LED chips 52. The light transmitter 57C is located frontward from the LED chips 52. The light transmitter 57C allows light emitted from the light emitter 52 to pass through. The light shield 60 is located radially outward from the outer cylinder 57A.

In the above structure, when light emitted from the LED chips 52 at least partially passes through the outer cylinder 57A, the light shield 60 located radially outward from the outer cylinder 57A reduces the likelihood that such light passing through the outer cylinder 57A reaches the eyes of the operator. This reduces glare to the operator. This structure can thus avoid lowering the visibility of a workpiece by the operator.

The light shield 60 in the present embodiment has a lower light transmittance than the optical member 57.

When light emitted from the LED chips 52 at least partially passes through the outer cylinder 57A, the light shield 60 with a lower light transmittance reduces the likelihood that such light passing through the outer cylinder 57A reaches the eyes of the operator.

The light shield 60 in the present embodiment is formed from a synthetic resin.

The light shield 60 is thus less likely to break than a light shield 60 formed from, for example, glass.

The light shield 60 in the present embodiment is formed from a polycarbonate resin containing a colored pigment.

The light shield 60 thus has high strength and is light-shielding.

The light shield 60 in the present embodiment is black.

The light shield 60 is thus highly light-shielding.

The impact tool 1 according to the present embodiment includes the first adhesive 70 fixing the optical member 57 and the light shield 60 together.

The optical member 57 and the light shield 60 are thus fixed together with the first adhesive 70.

The first adhesive 70 in the present embodiment is between the outer circumferential surface of the outer cylinder 57A and the inner circumferential surface of the light shield 60.

The first adhesive 70 is thus less likely to be exposed on the outer circumferential surface of the light shield 60.

The optical member 57 in the present embodiment has the grooves 57V and 57W recessed radially inward from the outer circumferential surface of the optical member 57. The grooves 57V and 57W receive the first adhesive 70.

Thus, an appropriate amount of the first adhesive 70 is placed in the grooves 57V and 57W.

The light shield 60 in the present embodiment includes the protrusion 60G located frontward from the grooves 57V and 57W. The protrusion 60G protrudes radially inward from the inner circumferential surface of the light shield 60.

The protrusion 60G prevents the first adhesive 70 from flowing out. The first adhesive 70 is thus less likely to overflow to the front end of the light shield 60 or to the front end of the optical member 57. For example, the first adhesive 70 is applied to the grooves 57V and 57W on the optical member 57, and the light shield 60 is then attached to the outer circumference of the optical member 57. This reduces overflowing of the first adhesive 70.

The protrusion 60G in the present embodiment has the inner end in contact with the optical member 57.

This effectively reduces the likelihood that the first adhesive 70 leaks to the front end of the light shield 60 or to the front end of the optical member 57.

The protrusion 60G in the present embodiment surrounds the optical member 57. The optical member 57 is fitted to the protrusion 60G.

The optical member 57 is fitted to the protrusion 60G and is thus fixed to the light shield 60. The optical member 57 in the present embodiment is lightly press-fitted to the protrusion 60G.

The light shield 60 in the present embodiment has the front end 60F surrounding the emission surface 57F of the light transmitter 57C.

The light shield 60 does not block light emitted through the emission surface 57F of the light transmitter 57C, thus allowing a workpiece to be illuminated appropriately.

In the present embodiment, the light shield 60 has the front end 60F aligned with or located frontward from the front end of the light transmitter 57C in the front-rear direction.

The light shield 60 thus sufficiently covers the outer circumferential surface of the optical member 57.

The impact tool 1 according to the present embodiment includes the substrate 51 surrounding the anvil 10 and including the ring portion 51A. The LED chips 52 are located on the front surface of the ring portion 51A.

The substrate 51 and the LED chips 52 are included in the COB LED 50. A workpiece is thus illuminated with light with high luminance.

The impact tool 1 according to the present embodiment includes the second adhesive 75 fixing the substrate 51 and the optical member 57 together.

The COB LED 50 and the optical member 57 are thus fixed together with the second adhesive 75.

The second adhesive 75 in the present embodiment fixes the rear surface of the substrate 51 and the inner circumferential surface of the outer cylinder 57A together.

This reduces the likelihood of the LED chips 52 being covered with the second adhesive 75.

The second adhesive 75 in the present embodiment is light-shielding.

Light emitted from the LED chips 52 is thus less likely to leak from the rear of the substrate 51 to an area around the impact tool 1. For example, with the case cover 5 being transparent, light from the LED chips 52 leaking rearward from the substrate 51 is blocked by the second adhesive 75 and is thus less likely to leak through the case cover 5 to the area around the impact tool 1.

The impact tool 1 according to the present embodiment includes the phosphor 55 covering the LED chips 52.

The phosphor 55 increases the luminance of light emitted from the LED chips 52. The phosphor 55 also protects the LED chips 52.

The optical member 57 in the present embodiment includes the inner cylinder 57B located radially inward from the ring portion 51A. The light transmitter 57C connects the front end of the outer cylinder 57A and the front end of the inner cylinder 57B.

The outer cylinder 57A in the optical member 57 is located radially outward from the ring portion 51A, and the inner cylinder 57B in the optical member 57 is located radially inward from the ring portion 51A, thus stabilizing the connection between the substrate 51 and the optical member 57.

Other Embodiments

In the above embodiment, the light shield 60 is formed from a polycarbonate resin containing a colored pigment. The light shield 60 may include a black coating applied on the surface of its polycarbonate resin member. The light shield 60 may be formed from rubber, an elastomer, or a metal.

In the above embodiment, the impact tool 1 is an impact driver. The impact tool 1 may be an impact wrench.

In the above embodiment, the electric work machine 1 is an impact tool as an example of a power tool. The power tool is not limited to an impact tool. Examples of the power tool include a driver drill, an angle drill, a screwdriver, a hammer, a hammer drill, a circular saw, and a reciprocating saw.

Figure 11:
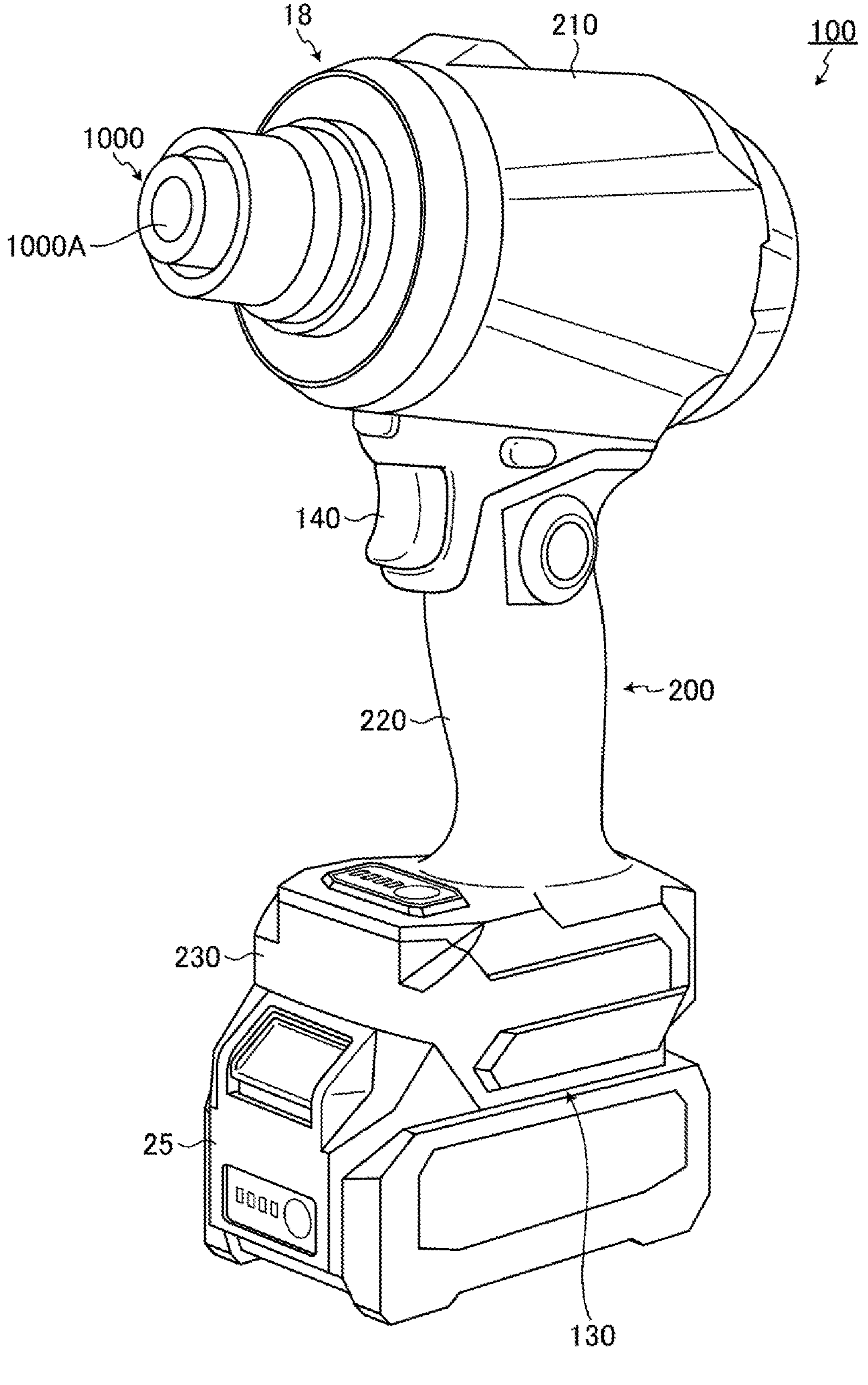
FIG. 11 is a perspective view of an electric work machine according to another embodiment as viewed from the front.

The electric work machine 1 may not be a power tool. FIG. 11 is a perspective view of an electric work machine 100 according to another embodiment as viewed from the front. The electric work machine 100 shown in FIG. 11 is an air duster. The electric work machine 100 includes a housing 200, a battery mount 130, a trigger switch 140, an output unit 1000, and a light unit 18. The housing 200 includes a motor compartment 210, a grip 220, and a battery holder 230. The grip 220 extends downward from a lower portion of the motor compartment 210. The battery holder 230 connects to a lower portion of the grip 220. The motor compartment 210 accommodates a motor and a fan (not shown in FIG. 11). The trigger switch 140 is located on the grip 220. The battery mount 130 is located in a lower portion of the battery holder 230. The battery mount 130 receives a battery pack 25. The output unit 1000 operates with a rotational force from the motor. The output unit 1000 is located frontward from the front end of the motor compartment 210. When the motor rotates, the fan rotates, thus jetting air from a jet opening 1000A in the output unit 1000. The light unit 18 described in the above embodiment may surround the output unit 1000 in the electric work machine 100.

In the above embodiment, the electric work machine (denoted with, for example, 1) may use utility power (alternating current power supply) in place of the battery pack 25.

REFERENCE SIGNS LIST

1 electric work machine (impact tool)
2 housing
2L left housing
2R right housing
2S screw
3 rear cover
3S screw
4 hammer case
4A rear cylinder
4B front cylinder
4C annular portion
4D protrusion
4E rear surface
4F slope
5 case cover
6 motor
7 reducer
8 spindle
8A flange
8B spindle shaft
8C ring portion
8D spindle groove
9 striker
10 anvil (output unit)
10A tool hole
10B recess
10C anvil shaft
10D anvil projection
11 tool holder
12 fan
12A bush
13 battery mount
14 trigger lever
15 forward-reverse switch lever
16 hand mode switch button
16A circuit board
16B switch
18 light unit
19 inlet
20 outlet
21 motor compartment
22 grip

23 battery holder
24 bearing box
25 battery pack
26 stator
27 rotor
28 stator core
29 front insulator
29S screw
30 rear insulator
31 coil
32 rotor core
33 rotor shaft
34 rotor magnet
35 sensor magnet
37 sensor board
37A magnetic sensor
37B resin-molded body
38 fusing terminal
39 rotor bearing
40 rotor bearing
41 pinion gear
42 planetary gear
42P pin
43 internal gear
44 spindle bearing
45 washer
46 anvil bearing
47 hammer
47A hammer groove
47B hammer projection
47C recess
48 ball
49 coil spring
50 chip-on-board light-emitting diode (COB LED)
51 substrate
51A ring portion
51B support
52 LED chip (light emitter)
54 bank
55 phosphor
57 optical member
57A outer cylinder
57B inner cylinder
57C light transmitter
57D protrusion
57E incident surface
57F emission surface
57K recess
57M rear slide
57N front slide
57P front surface
57Q slope
57T facing surface
57V groove
57W groove
58 lead wire
59 resistor
60 light shield
60A cylinder
60B protrusion
60C abutment surface
60D groove
60E groove
60F front end
60G protrusion
70 first adhesive
75 second adhesive
80 sponge ring
90 tip tool
100 electric work machine
130 battery mount
140 trigger switch
200 housing
210 motor compartment
220 grip
230 battery holder
1000 output unit
1000A jet opening
AX rotation axis

What is claimed is:

1. An electric work machine, comprising:
a motor;
an output unit operable with a rotational force from the motor;
a light emitter at least partially surrounding the output unit;
an optical member including
an outer cylinder located radially outward from the light emitter, and
a light transmitter located frontward from the light emitter, the light transmitter being configured to allow light emitted from the light emitter to pass through;
a light shield located radially outward from the outer cylinder; and
a first adhesive between an outer circumferential surface of the outer cylinder and an inner circumferential surface of the light shield.

2. The electric work machine according to claim 1, wherein
the light shield has a lower light transmittance than the optical member.

3. The electric work machine according to claim 1, wherein
the light shield comprises a synthetic resin.

4. The electric work machine according to claim 1, wherein
the light shield comprises a polycarbonate resin containing a colored pigment.

5. The electric work machine according to claim 1, wherein
the light shield is black.

6. The electric work machine according to claim 1, wherein
the optical member has a groove recessed radially inward from an outer circumferential surface of the optical member, and the groove receives the first adhesive.

7. The electric work machine according to claim 6, wherein
the light shield includes a protrusion located frontward from the groove, and the protrusion protrudes radially inward from an inner circumferential surface of the light shield.

8. The electric work machine according to claim 7, wherein
the protrusion has an inner end in contact with the optical member.

9. The electric work machine according to claim 8, wherein
the protrusion surrounds the optical member, and
the optical member is fitted to the protrusion.

10. The electric work machine according to claim 1, wherein the light shield has a front end surrounding an emission surface of the light transmitter.

11. The electric work machine according to claim 1, wherein the light shield has a front end aligned with or located frontward from a front end of the light transmitter in a front-rear direction.

12. The electric work machine according to claim 1, further comprising:

a substrate surrounding the output unit and including a ring portion, wherein the light emitter includes a light-emitting diode chip on a front surface of the ring portion.

13. The electric work machine according to claim 12, further comprising:

a second adhesive fixing the substrate and the optical member together.

14. The electric work machine according to claim 13, wherein the second adhesive fixes a rear surface of the substrate and an inner circumferential surface of the outer cylinder together.

15. The electric work machine according to claim 13, wherein the second adhesive is light-shielding.

16. The electric work machine according to claim 12, further comprising:

a phosphor covering the light-emitting diode chip.

17. The electric work machine according to claim 12, wherein the optical member includes an inner cylinder located radially inward from the ring portion, and the light transmitter connects a front end of the outer cylinder and a front end of the inner cylinder.

18. The electric work machine according to claim 1, wherein the output unit includes an anvil strikable by a hammer in a rotation direction.

19. An electric work machine, comprising:

a motor;

an output unit operable with a rotational force from the motor;

a light emitter at least partially surrounding the output unit;

an optical member including an outer cylinder located radially outward from the light emitter, and a light transmitter located frontward from the light emitter, the light transmitter being configured to allow light emitted from the light emitter to pass through;

a light shield located radially outward from the outer cylinder;

a substrate surrounding the output unit and including a ring portion; and an adhesive fixing the substrate and the optical member together, wherein the light emitter includes a light-emitting diode chip on a front surface of the ring portion.

* * * * *